United States Patent [19]
Kurtz et al.

[11] 3,887,626
[45] June 3, 1975

[54] OXIDATION OF 2-CHLOROBUTENE TO CHLOROPRENE

[75] Inventors: Abraham Nathan Kurtz, Charleston, W. Va.; Melvin Lee Farmer, Bangkok, Thailand

[73] Assignee: Union Carbide Corporation, New York, N.Y.

[22] Filed: Nov. 6, 1973

[21] Appl. No.: 413,316

[52] U.S. Cl. .............................................. 260/655
[51] Int. Cl. ........................ C07c 17/00; C07c 21/20
[58] Field of Search ...................... 260/655, 654 D

[56] References Cited
UNITED STATES PATENTS
2,951,103   8/1960   Ellsworth et al. ................ 260/654 D
3,079,445   2/1963   Arganbright ........................ 260/655
3,207,805   9/1965   Gay ..................................... 260/655

FOREIGN PATENTS OR APPLICATIONS
961,856   6/1964   United Kingdom ................. 260/655

*Primary Examiner*—D. Horwitz
*Attorney, Agent, or Firm*—C. J. Metz

[57]         ABSTRACT

There is disclosed a process for the production of chloroprene which comprises contacting a feed mixture consisting essentially of oxygen and 2-chlorobutene with a catalyst at an elevated temperature and for a period of time sufficient to produce chloroprene.

6 Claims, No Drawings

OXIDATION OF 2-CHLOROBUTENE TO CHLOROPRENE

The invention relates to a process for the production of chloroprene from 2-chlorobutene.

Chloroprene is a valuable product having substantial commercial utility in the production of rubber-like products. Many processes have been disclosed in the literature for the production of chloroprene. One such process is disclosed in British Pat. No. 961,856. The process disclosed therein comprises heating a mixture of 2-chlorobutene, hydrogen chloride, and oxygen, in the presence of a catalyst consisting of either magnesium chloride or one or more rare earth metal chlorides supported on a pumice catalyst support. The reaction is carried out at temperatures above about 450°C., up to about 600°C.

In accordance with the present invention, it has been discovered that chloroprene can be produced by contacting 2-chlorobutene with air or oxygen in the presence of a catalyst. Surprisingly, the chloroprene is produced without the addition of hydrogen chloride to the reaction mixture. This is an economic advantage because the necessity for using one raw material has been eliminated, and the amount of hydrogen chloride in the reaction mixture and effluent stream is minimized. There is therefore less of a corrosion problem and the separation of the effluent stream into its components is thereby simplified.

In carrying out the present invention, a feed mixture consisting essentially of oxygen and 2-chlorobutene, said feed mixture being free of hydrogen chloride, is fed into a reaction zone containing a catalyst. The feed mixture is maintained in the reaction zone for a period of time and at an elevated temperature sufficient to produce chloroprene.

The 2-chlorobutene reactant can be either 2-chloro-2-butene or 2-chloro-1-butene.

The second reactant of the feed mixture is oxygen. Either pure oxygen or oxygen diluted with an inert material can be employed. Such inert material can include nitrogen, helium, water vapor or steam, and carbon dioxide. It is preferred to employ either oxygen or oxygen-enriched air. The proportion of oxygen to 2-chlorobutene can vary over a fairly wide range, for example, a molar ratio of oxygen: 2-chlorobutene of from about 1:1 to about 10:1, and preferably of about 5:1 is preferred. At lower ratios, the process tends to become inefficient, and at higher ratios the feed stream becomes too dilute, both of which adversely affect the economies of the reaction.

The preferred catalyst for use in the invention is magnesium chloride supported on a catalyst support such as pumice, although other supports such as alumina, silica, and silica-alumina can be employed if desired. The magnesium chloride catalyst can readily be produced by saturating the support with a solution, which can be aqueous or otherwise, of magnesium chloride, followed by drying the impregnated support to remove the solvent. The preparation of this catalyst is further described in British Pat. No. 961,856 and in U.S. Pat. No. No. 3,079,445. The proportion of the catalyst on the support is not narrowly critical. For example, as a general rule, the magnesium chloride will constitute from about 5 to about 50, and preferably from about 10 to about 15, weight percent of the weight of the catalyst plus support. Other catalysts that can be used include rare earth metal chlorides and vanadium pentoxide, which will also usually be supported on a catalyst support.

The process of the invention can be carried out by introducing the feed mixture containing the 2-chlorobutene and oxygen into a reaction zone containing the catalyst. Conveniently, the reaction zone may be contained in a tubular reactor. The process of the invention is carried out at elevated temperatures, for example, at a temperature within the range of from about 450° to about 600°C., and preferably from about 475° to 525°C. The contact time with the catalyst is not narrowly critical, and can vary from about 0.1 to about 20 seconds, and is preferably from about 1 to about 10 seconds. The pressure under which the process is carried out is not critical, and while atmospheric pressure is preferred for economic reasons, it can be carried out at subatmospheric pressure or superatmospheric pressure. For instance, pressures within a range of from about 0.5 to about 10 atmospheres can be employed.

The reaction equipment can be quartz, glass or glass-lined, or other material that is inert to the reactants such as porcelain and corrosion-resistant metals.

The chloroprene product can be recovered from the effluent from the reaction zone by customary procedures. For example, the effluent can be cooled to condense it, and can then be separated by fractional distillation. Unreacted 2-chlorobutene can then be recycled to the feed mixture.

The following examples illustrate various aspects of the invention:

The reactor employed in the Examples was a quartz tube having an internal diameter of 21 millimeters. The tube contained a centrally located quartz thermocouple well having an outside diameter of 6.5 millimeters. The tube was placed in an electrically heated, 4-inch diameter copper block. The catalyst (or quartz chips) was packed into the annular space between the inner wall of the quartz tube and the outer wall of the thermocouple well for a length of 25 centimeters, equivalent to a catalyst volume of 75 milliliters or a free volume (when using quartz chips 4 × 8 mesh) of 32 milliliters.

Effluent from the reactor was collected in a dry ice/acetone trap.

EXAMPLE 1

(The following is a "blank" run to show that there is essentially no non-catalytic contribution to the reaction.)

A mixture of 0.0915 mole per hour of 2-chloro-2-butene (17.8 percent trans and 81.4 percent cis isomer), and 0.40 mole per hour of nitrogen was fed to the reactor packed with quartz chips at 500°C. The products were trapped at dry ice temperature. Analysis of the products showed no change from the feed.

A similar run was made in which 0.40 mole per hour of air was used in place of the nitrogen; the organic product (8.6 grams) contained 1.69 weight percent $C_4H_6$ hydrocarbons, 0.9 weight percent chloroprene, and 96.7 weight percent 2-chloro-2-butene.

EXAMPLE 2

In a manner analogous to that described in Example 1, 75 milliliters of pumice, 4 × 8 mesh, was placed in the reactor and tested under nitrogen, then with air, using the same molar proportions of reactants as employed in Example 1.

With nitrogen, an 8.3 weight percent yield of $C_4H_6$ hydrocarbons at 14 percent conversion was obtained, with no chloroprene evident. With air, the conversion of 2-chloro-2-butenes amounted to 34 percent; a 19.9 weight percent yield of $C_4H_6$ hydrocarbons and 14.6 weight percent yield of chloroprene was obtained.

EXAMPLE 3

A catalyst consisting of magnesium chloride on pumice was produced by adding 100 grams of 4 × 8 mesh pumice to 115 grams of a solution of 15 grams of magnesium chloride in methanol. The methanol was evaporated after allowing the mixture to stand for 2 hours at room temperature. The catalyst/support mixture was then heated in air to 500°C., and was held at that temperature for 2 hours.

The catalyst (28.3 grams) was loaded in the 75 milliliter space in the quartz tube. In a manner analogous to that described in Example 1, a mixture of air and 2-chloro-2-butene was fed to the reactor, which was maintained at 500°C. The air and 2-chloro-2-butene were fed in the proportions given in Example 1. A conversion of 50 percent was obtained with a 24.9 percent yield of $C_4H_6$ hydrocarbons and a 24.0 percent yield of chloroprene.

EXAMPLE 4

The table below summarizes the results obtained with a series of runs using magnesium chloride on pumice (as described in Example 3) as the catalyst. The runs were each carried out by a procedure analogous to that described in Example 1. The table displays proportions of reactants, temperature, contact time with the catalyst, and the results.

EXAMPLE 5

In a manner similar to Example 1, a mixture of 0.0915 mole per hour of 2-chloro-2-butene and 0.40 mole per hour of nitrogen was passed over 75 milliliters of copper chloride-potassium chloride-didymium chloride on low surface area alumina (<1 square meter/gram, 90 percent $Al_2O_3$) at 500°C.; the product showed 10 percent conversion to $C_4H_6$ hydrocarbons, being mainly 2-butyne.

Repeating the test with 0.40 mole air per hour in place of the nitrogen, the conversion of 2-chloro-2-butene was 11 percent with a 6.5 percent yield of chloroprene and a 4.0 percent yield of $C_4H_6$ hydrocarbons.

Increasing the amount of oxygen to a feed ratio of 2.6 gave an increase in conversion to 21 percent but failed to alter the product efficiencies significantly.

EXAMPLE 6

In a manner similar to Example 5, a mixture of 0.0915 mole per hour of 2-chloro-2-butene and 0.40 mole per hour of nitrogen was passed over 75 milliliters of 10 percent vanadium pentoxide on alumina (Harshaw V–0301 T ⅛-inch) for 1 hour at 400°C.; 75 percent of the 2-chloro-2-butene was converted, the yields of chloroprene being 4.9 percent and of $C_4H_6$ hydrocarbons being 27 percent.

Substitution of 0.40 mole per hour of air instead of nitrogen gave 75 percent conversion, 14 percent yield of chloroprene and 20 percent yield of $C_4H_6$ hydrocarbons.

A similar experiment with 75 milliliters of 10 percent vanadium pentoxide on low surface area alumina (1 square meter/gram, Harshaw V–0501 T ⅛-inch) employing air as in the previous paragraph, gave 25 percent conversion, a 5 percent yield of chloroprene and a 20 percent yield of $C_4H_6$ hydrocarbons.

What is claimed is:

1. A process for the production of chloroprene which comprises introducing a feed mixture consisting essentially of oxygen and at least one of 2-chloro-2-butene and 2-chloro-1-butene, said feed mixture being free of hydrogen chloride, into a reaction zone containing a catalyst selected from the group consisting of magnesium chloride, rare earth metal chloride, and vanadium pentoxide, and maintaining said feed mixture in said reaction zone for a period of time and at an elevated temperature sufficient to produce chloroprene, said temperature being within the range of from about 450° to about 600°C.

2. The process of claim 1 wherein said catalyst is magnesium chloride supported on a catalyst support.

| Run No. | Moles Fed Per Hour | | | Temp. °C. | contact time seconds | conversion, percent | Yields (Mole Percent) | | |
|---|---|---|---|---|---|---|---|---|---|
| | 2-chloro-2-butene | nitrogen | oxygen | | | | $C_4H_6$ | 2-butyne | chloroprene |
| 1 | 0.0915 | 0.2928 | 0.0732 | 450 | 4 | 19.7 | 14.3 | 12.7 | 5.4 |
| 2 | 0.0915 | 0.2104 | 0.2196 | 450 | 3 | 18.5 | 11.0 | 9.8 | 7.5 |
| 3 | 0.0915 | 0.2928 | 0.0732 | 500 | 4 | 38.5 | 17.6 | 14.2 | 17.9 |
| 4 | 0.0915 | 0.2104 | 0.2196 | 500 | 3 | 51.2 | 16.6 | 13.2 | 32.6 |
| 5 | 0.0461 | 0.0922 | 0.2305 | 500 | 5 | 72.2 | 6.5 | 4.2 | 60.8 |
| 6 | 0.0461 | 0.0922 | 0.2305 | 500 | 5 | 73.4 | 15.2 | 8.5 | 52.4 |
| 7 | 0.0915 | 0.2928 | 0.0732 | 550 | 4 | 44.4 | 27.3 | 18.3 | 16.7 |
| 8 | 0.0915 | 0.1464 | 0.0366 | 550 | 6 | 34.2 | 26.4 | 19.3 | 7.6 |
| 9 | 0.0915 | 0.0366 | 0.0092 | 550 | 12 | 22.9 | 21.3 | 19.4 | 1.4 |

3. The process of claim 2 wherein said catalyst support is pumice.

4. The process of claim 2 wherein said period of time is within the range of from about 0.1 to about 20 seconds.

5. The process of claim 2 wherein the molar proportion of oxygen to 2-chlorobutene in said feed mixture is within the range of from about 1:1 to about 10:1.

6. The process of claim 2 wherein said feed mixture consists essentially of oxygen and 2-chloro-2-butene.

* * * * *